(12) United States Patent
Cheung

(10) Patent No.: US 10,718,350 B2
(45) Date of Patent: Jul. 21, 2020

(54) FAN BLADE WITH GALVANIC SEPARATOR

(71) Applicant: PRATT & WHITNEY CANADA CORP., Longueuil (CA)

(72) Inventor: Kin-Leung Cheung, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 610 days.

(21) Appl. No.: 15/361,052

(22) Filed: Nov. 24, 2016

(65) Prior Publication Data

US 2018/0142698 A1 May 24, 2018

(51) Int. Cl.
| F04D 29/38 | (2006.01) |
| F04D 29/32 | (2006.01) |
| F01D 5/28 | (2006.01) |
| F04D 29/02 | (2006.01) |
| F02K 3/06 | (2006.01) |

(52) U.S. Cl.
CPC ........... *F04D 29/388* (2013.01); *F01D 5/282* (2013.01); *F04D 29/023* (2013.01); *F04D 29/324* (2013.01); *F04D 29/325* (2013.01); *F02K 3/06* (2013.01); *F05D 2300/50* (2013.01); *F05D 2300/601* (2013.01); *F05D 2300/603* (2013.01)

(58) Field of Classification Search
CPC .... F04D 29/388; F04D 29/023; F04D 29/324; F04D 29/325; F01D 5/282; F01D 5/28; F01D 5/286; F01D 5/288; F02K 3/06; F05D 2300/50; F05D 2300/601; F05D 2300/603; F05D 2300/6012

USPC ....................... 416/230, 229 R, 241 R, 241 A
See application file for complete search history.

(56) References Cited

U.S. PATENT DOCUMENTS

| 2,959,229 A | 10/1957 | Meier | |
| 3,762,835 A * | 10/1973 | Carlson | B29C 70/04 416/224 |
| 3,775,208 A * | 11/1973 | Grigoleit | B05D 1/10 156/178 |
| 4,036,601 A * | 7/1977 | Weimar | F01D 5/288 228/173.6 |
| 5,894,053 A * | 4/1999 | Fried | C23C 4/02 228/119 |
| 7,435,056 B2 * | 10/2008 | Liston | F01D 5/282 415/191 |
| 8,721,294 B2 | 5/2014 | Watson | |
| 9,157,327 B2 * | 10/2015 | Deal | F01D 5/147 |
| 10,041,361 B2 * | 8/2018 | Anand | B22F 3/10 |
| 2014/0030105 A1 * | 1/2014 | Fameau | F01D 5/147 416/229 A |
| 2014/0147620 A1 * | 5/2014 | Li | B29C 70/20 428/114 |

(Continued)

*Primary Examiner* — Kenneth J Hansen
*Assistant Examiner* — Eric J Zamora Alvarez
(74) *Attorney, Agent, or Firm* — Norton Rose Fulbright Canada LLP

(57) ABSTRACT

A fan blade for a fan of a gas turbine engine is described which includes an airfoil having an inner core and an outer shell composed of different metals, and a galvanic separator therebetween. The galvanic separator including an adhesive layer covering said at least a portion of the inner core, and a non-conductive fabric covering the adhesive layer. A plurality of solid metal particles may be disposed on an outer surface of the non-conductive fabric layer, between the non-conductive fabric layer and the outer shell.

20 Claims, 2 Drawing Sheets

(56) References Cited

U.S. PATENT DOCUMENTS

2016/0003062 A1* 1/2016 Murdock ............... F01D 5/147
416/224

* cited by examiner

FAN BLADE WITH GALVANIC SEPARATOR

TECHNICAL FIELD

The application relates generally to gas turbine engines, and, more particularly, to fan blades for gas turbine engines.

BACKGROUND

The low density of aluminum makes it an attractive material choice for manufacturing lightweight fan blades for a turbofan gas turbine engine. However, aluminum is less well adapted than some other metals to withstand foreign object damage (FOD) and/or erosion over time. In order to reinforce aluminum fan blades, a sheath formed of a stronger and/or more resilient material, such as titanium or another high modulus metal, is sometimes added along a leading edge of the aluminum fan blades. However, such bi-metallic blade constructions can result in galvanic corrosion occurring. While attempts have been made to limit this galvanic corrosion, improvements in this regard are still sought.

SUMMARY

There is accordingly provided a fan blade for a fan of a gas turbine engine, the fan blade comprising a root and an airfoil extending from the root to a tip, at least the airfoil having an inner core and an outer shell covering at least a portion of the inner core, the inner core composed of a first metal, the outer shell composed of a second metal different from the first metal, a galvanic separator sandwiched between the inner core and the outer shell, the galvanic separator including an adhesive layer covering said at least a portion of the inner core, a non-conductive fabric covering the adhesive layer; and a plurality of solid metal particles disposed on an outer surface of the non-conductive fabric layer and disposed between the non-conductive fabric layer and the outer shell.

There is also provided a method of galvanically protecting a fan blade of a fan of a gas turbine engine, the fan blade having a core made of a first metal and a protective outer shell covering at least a portion the core, the outer shell formed of a second metal different from the first metal, the method comprising galvanically separating the core of the fan blade from the outer shell by applying a galvanic separation layer therebetween, the galvanic separation layer comprising an adhesive layer formed of a supported film adhesive having a non-metallic mat embedded therein, and a non-conductive fabric layer superposed on top of the adhesive layer.

There is further provided a turbomachine component of a gas turbine engine, the turbomachine component comprising an airfoil having a core made of a first metal, an outer shell covering at least a portion of the core of the airfoil, and a galvanic separator disposed between the at least a portion of the core and the outer shell, the outer shell being composed of a second metal different than the first metal of the core, the galvanic separator comprising: an adhesive film covering the at least a portion of the core; a non-conductive fabric covering the adhesive film; and a plurality of solid metal particles between the non-conductive layer and the outer shell.

In accordance with a further aspect, there is provided a component of a gas turbine engine comprising a core made of aluminum, an outer shell covering at least one portion of the core, and a galvanic separation layer disposed between the at least one portion of the core and the outer shell, the outer shell being composed of a different metal than the core, the galvanic separation layer comprising an adhesive film covering the at least one portion of the core; a non-conductive layer covering the adhesive film; and solid metal particles sandwiched between the non-conductive layer and the outer shell.

In accordance with a further aspect, there is provided a fan for a gas turbine engine comprising a plurality of fan blades, each of the plurality of fan blades including a fan blade core made of aluminum, an outer shell covering at least a portion of the fan blade core, and a galvanic separation layer disposed between the at least a portion of the fan blade core and the outer shell, the outer shell being composed of a different metal than the fan blade core, the galvanic separation layer comprising an adhesive layer covering the at least one portion of the fan blade core; a non-conductive fabric layer covering the adhesive film; and solid metal particles sandwiched between the non-conductive layer and the outer shell.

BRIEF DESCRIPTION OF THE DRAWINGS

Reference is now made to the accompanying figures in which.

DETAILED DESCRIPTION

Figure 1:
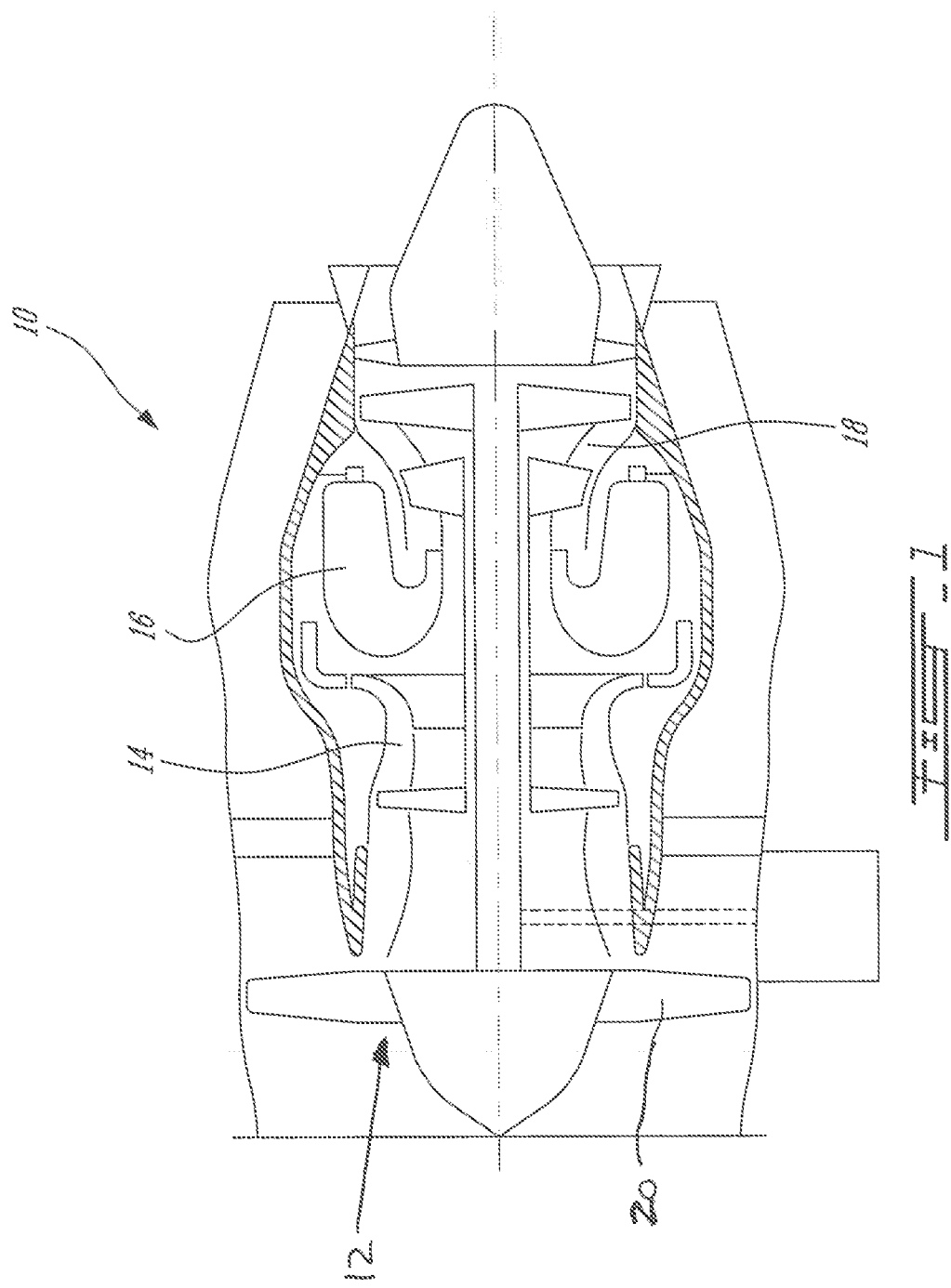
FIG. 1 is a schematic cross-sectional view of a gas turbine engine.

FIG. 1 illustrates a gas turbine engine 10 of a type preferably provided for use in subsonic flight, generally comprising serial flow communication with a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

While aluminum fan blades provide certain advantages, including notably weight savings in comparison to a number of other metals, such aluminum fan blades are typically less resistant to corrosion and/or foreign objection damage (FOD) than corresponding blades made of other suitable metals. For example, manufacturing a fan blade out of solid titanium would provide a blade that is less prone to corrosion and more resilient to FOD in comparison with a corresponding aluminum fan blade, however this solution is less desirable for airborne gas turbine engines due to the weight penalty that would be imposed by a fan formed of fully titanium blades.

As will be described in further detail below, the present disclosure accordingly provides a fan blade 20 that is formed of an aluminum core 102, at least a portion of which is covered, and thus reinforced, by an outer sheath or "shell" 108. The outer shell 108 is formed of a different metal than the inner core. In one embodiment, the metal of the outer shell has a higher strength and/or modulus than does the metal of the inner core. For example, the inner core may be formed of aluminum that is partially covered or entirely encapsulated by an outer protective shell 108 formed of titanium, cobalt, or combinations and/or alloys thereof. In one embodiment, the entirety of at least the air-contacting portion of the blade 20 is covered by the protective shell 108 formed of a different metal than the inner core 102. Alternately, only a portion of the inner core 102, such as the leading edge 28 thereof, may be covered by the outer protective shell 108 formed of the different metal. As will be seen, an intermediate layer, in the form of a galvanic separator 112, is however provided between the inner aluminum core 102 and the outer reinforcing shell 108, in order to limit galvanic corrosion which may otherwise occur between the two dissimilar metals.

Figure 2:
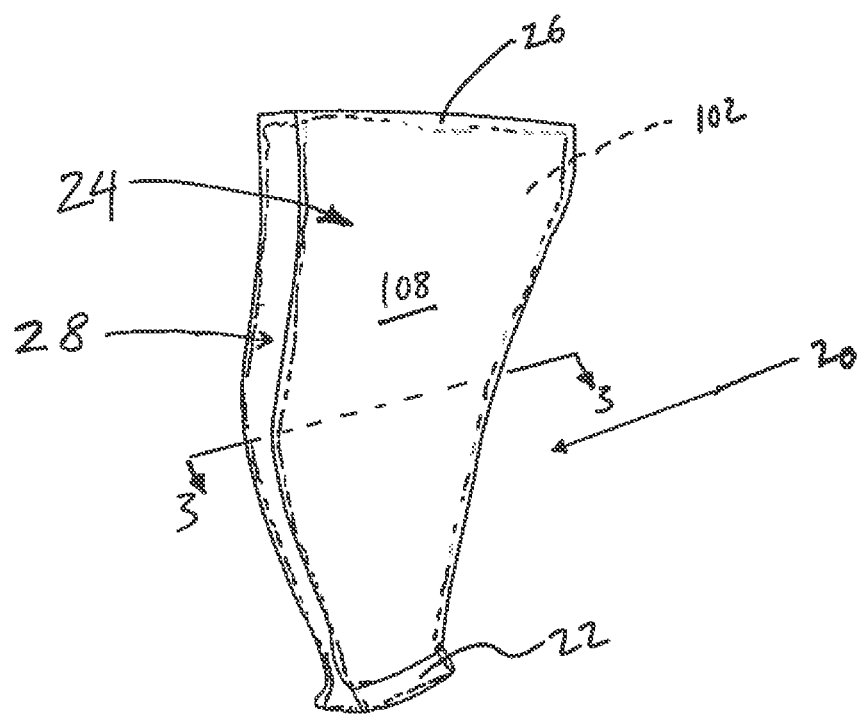
FIG. 2 is a schematic perspective view of a fan blade of the fan of the gas turbine engine of FIG. 1.

Referring now to FIG. 2, a blade 20 (referred to herein as "blade" or "fan blade") of the fan 12 of the gas turbine engine 10 (see FIG. 1) includes a blade root 22 and an airfoil 24 extending from the blade root 22 to a tip 26 of the blade 20. The blade 20 is formed of an inner core 102 composed of a first metal, and an outer shell, which fully encapsulates the inner core 102 over at least the airfoil 24 thereof, the outer shell 108 being composed of a second metal different than the first metal. The second metal of the outer shell 108 has a higher strength and/or modulus than the first metal of the inner core 102. Accordingly, the outer shell 108 is stronger than the inner core 102, and the inner core may therefore have a lower density and thus be lighter weight than the outer shell. In one particular embodiment, the inner core 102 of the fan blade 20 is formed of aluminum and/or aluminum alloy(s), and the outer shell 108 is formed of cobalt and/or cobalt alloy(s). Alternately, the outer shell 108 may be formed of titanium and/or titanium alloy(s). In either case, the outer shell 108 may be also formed of the selected metal and having a nanocrystalline grain structure, having for example a grain size in the range of 1 to 50 nanometers.

As will now be explained in greater detail, a galvanic separator 112 is disposed between the inner core 102 and the outer shell 108, in order to limit galvanic corrosion which may otherwise occur between the two dissimilar metals.

Figure 3:
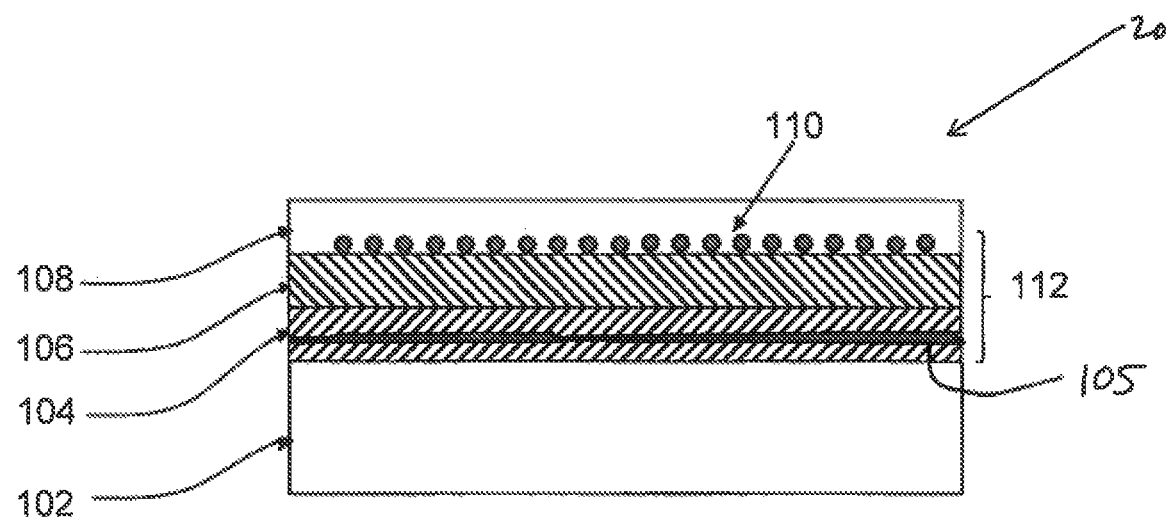
FIG. 3 is a partial cross-sectional schematic view of the fan blade of FIG. 2, taken through line 3-3 in FIG. 2.

Referring now to FIG. 3, the protective outer shell 108 covers at least the airfoil 24 of the blade 20, thereby entirely covering, and thus encapsulating, the inner core 102 within the air-contacting surfaces of the airfoil 24 of the blade 20. The protective outer shell 108, which is formed of a metal having a higher strength and/or modulus than the inner core 102, helps to protect the blade 20 against FOD and/or erosion. The outer shell 108 is thus composed of a more resistant material than the inner core 102, which may include, but is not limited to: titanium; chromium; nickel; cobalt; and alloys thereof. Regardless of the material selected for the protective outer shell 108, the inner core 102 is composed of a lower density, but less resistant, metal, such as aluminum.

Since the inner core 102 and the outer shell 108 are not made of the same metal, galvanic corrosion may occur between the two dissimilar metals, thereby potentially resulting in undesirable corrosion of one or both of the core and the outer shell. To limit this galvanic corrosion, the galvanic separator 112 is disposed between the inner core 102 and the outer shell 108.

In an embodiment of the present disclosure, the galvanic separator 112 is formed of a sandwiched construction comprising several layers, including at least: an inner-most adhesive film 104 that is applied directly onto the outer surfaces of the blade core 102; a non-conductive fabric 106 disposed overtop of the inner adhesive film 104; and a plurality of solid metal particles 110 disposed over an outwardly-facing surface of the non-conductive fabric 106. These solid metal particles 110 are sandwich between the non-conductive fabric layer 106 and the outer shell 108, once the outer shall 108 is applied overtop of the galvanic separator 112, which is thereby retained between the inner core 102 and the outer shell 108. The solid metallic particles 110 may help to improve bonding between the galvanic separator 112 and the outer metallic shell 108 and/or help to seed for the plating of the outer metallic shell 108 onto the galvanic separator 112. The outer metallic shell 108 may therefore be plated onto, or may be otherwise suitable applied overtop of, the galvanic separator 112, thereby at least partially coating or encapsulating the inner core 102 therewithin. The solid metal particles 110 may be formed of a metal that is the same as, or different from, the metal selected for the outer shell 108. For example, the solid metal particles 110 may be formed, in at least one particular embodiment, of cobalt, nickel, copper, silver, aluminum, or any suitable combinations thereof, while the outer shell 108 may for example be formed of a nickel, titanium or cobalt plating.

In one particular embodiment, the inner-most adhesive film 104 is a "supported film" adhesive, which itself includes a non-metallic mat 105 embedded therein. The non-metallic mat may be an open weave mat, which is formed, for example, of nylon or polyester. The adhesive film 104 may, within which this non-metallic open weave mat 105 is embedded, may for example be epoxy, acrylic, polyurethane, neoprene, silicone, synthetic rubber, or any suitable combinations thereof. Also, any other suitable adhesive known in the art and suitable for use in such gas turbine engine applications may also be used.

The non-conductive fabric 106 may comprise non-metallic fabric materials such as, but not limited to, glass fabric, polymer fabric, and/or fiber reinforced fabric, such as nylon, polyester, acrylic, elastane, Spandex™, Lycra™, or other polyester-polyurethane copolymers. The non-conductive fabric 106 may also comprise woven or non-woven fabric. Any other suitable combinations of the above mentioned materials may be used. Although the non-conductive fabric 106 may, in one particular embodiment, form a single, un-interrupted, fabric sheet or fabric stock, in alternate embodiments the non-conductive fabric 106 may also include a number of separate fabric segments which are positioned between the adhesive film 104 and the outer shell 108. The fabric segments forming the non-conductive fabric layer 106 may be either aligned in predetermined configurations or randomly positioned to form a continuous fabric layer. In either case, the separate fabric segments may or may not overlap each other.

As will be understood, therefore, the galvanic separator 112 forms a galvanic separation layer between the inner core 102, formed of the first metal, and the outer shell 108, formed of the second material. This galvanic separator 112 includes two different non-metallic fabric and/or fiber plies/mats, namely a non-metallic open weave mat 105 embedded in the inner-most supported film adhesive 104, and the main non-conductive fabric 106 which lies between the supported film adhesive 104 and the metallic outer shell 108. The plurality of metal particles 110 are disposed on the non-conductive fabric layer 106, in order to, amongst other things, foster better adhesion between the outer metal shell 108 and the non-conductive fabric ply layer 106. The metal particles 110 on the non-conductive fabric layer 106 may also help to provide a mechanical "interlock" between the metallic outer shell 108 and the supported film adhesive 104.

A method of manufacturing the FOD impact and erosion-resistant fan blade 20 is also disclosed. The method comprises the steps of applying the adhesive film 104 over at least one portion of the fan blade core 102 made of aluminum. Then, the non-conductive fabric layer 106 is disposed to cover the adhesive film 104. The adhesive film 104 thereby retains the non-conductive fabric layer 106. Solid metallic particles 110 may then disposed over the non-conductive fabric layer 106. In another embodiment, however, the non-conductive fabric layer 106 may already have the solid metallic particles 110 attached to an outer surface thereof, prior to the non-conductive fabric layer 106 being deposited in place over the adhesive layer 104 on the inner core 102 of the blade.

A method of protecting a rotating component 100 of a gas turbine engine 10 against erosion and impact is also disclosed. The method comprises galvanically separating a core of the component 102 made of aluminum from an outer shell 108, by applying a galvanic separator 112 over the core of the component 102. In an embodiment, the galvanic separator 112 comprises an adhesive layer 104, a non-conductive fabric layer 106, and a layer of solid metallic particles 110, respectively stacked overtop of each other.

The step of applying the galvanic separator 112 may comprise the steps of: a) applying the adhesive layer 104 on the at least one portion of the core of the component 102; b) after step a), tackify the non-conductive fabric layer 106 and dispose it over the adhesive layer 104; c) after step b), disposing the solid metallic particles 110 on the non-conductive fabric layer; d) after step c), curing and bonding the adhesive layer 104, the non-conductive fabric layer 106 comprising the solid metallic particles 110 over the core of the component 102, thereby forming the galvanic separator 112; e) after step d), grit blasting the galvanic separation layer 112 to expose the solid metallic particles 110 encapsulated by adhesive from the curing and bonding processing of step d); and f) after step e), plating the outer shell 108 to the component 100 over the non-conductive fabric layer, having the solid metallic particles 110, of the galvanic separation layer 112.

The method may also comprise the step of disposing solid metal particles 110 over the non-conductive layer 106 after the step of disposing the non-conductive layer 106 and before the step of plating or other affixing the outer shell 108.

Although the combination of the outer shell 108 and the galvanic separator 112 has been used to cover a fan blade core 102, it may also be used to protect other components, such as, but not limited to, a blade of a propeller, components of the compressor and of the turbine.

In another embodiment, the galvanic separator 112 may also comprise intermediate adhesive and/or fabric layers to promote adhesion and galvanic separation. Also, the adhesive layer 104 and the non-conductive layer 106 may be integrally formed, such as an adhesive impregnated fabric.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fan blade for a fan of a gas turbine engine, the fan blade comprising a root and an airfoil extending from the root to a tip, at least the airfoil having an inner core and an outer shell covering at least a portion of the inner core, the inner core composed of a first metal, the outer shell composed of a second metal different from the first metal, a galvanic separator sandwiched between the inner core and the outer shell, the galvanic separator including an adhesive layer covering said at least a portion of the inner core, a non-conductive fabric covering the adhesive layer; and a plurality of solid metal particles disposed on an outer surface of the non-conductive fabric layer and disposed between the non-conductive fabric layer and the outer shell, the plurality of solid metal particles in contact with the outer shell along contact interfaces therebetween, at least one of the contact interfaces between the outer shell and at least one of the plurality of solid metal particles extending over a majority of an outer surface of the at least one of the plurality of solid metal particles.

2. The fan blade according to claim 1, wherein the first metal of the inner core is aluminum or alloys thereof, and the second metal of the outer shell has a strength and/or modulus that is greater than that of aluminum.

3. The fan blade according to claim 1, wherein the at least a portion of the inner core covered by the outer shell comprises an entirety of the airfoil, the outer shell fully encapsulating the inner core of the fan blade.

4. The fan blade according to claim 1, wherein the non-conductive fabric layer of the galvanic separator is formed of an un-interrupted fabric sheet or fabric stock.

5. The fan blade according to claim 1, wherein the non-conductive fabric layer is selected from a group consisting of glass fabric, polymer fabric, woven fabric, non-woven fabric, and combinations thereof.

6. The fan blade according to claim 5, wherein the polymer fabric includes at least one of nylon, polyester, acrylic, and elastane.

7. The fan blade according to claim 1, wherein the adhesive layer is a supported film adhesive having a non-metallic mat embedded therein.

8. The fan blade according to claim 7, wherein the non-metallic mat is an open weave mat.

9. The fan blade according to claim 8, wherein the open weave mat is formed of nylon or polyester.

10. The fan blade according to claim 1, wherein the adhesive layer is primarily formed of a material selected from a group consisting of epoxy, acrylic, polyurethane, neoprene, silicone, synthetic rubber, and combinations thereof.

11. The fan blade according to claim 1, wherein the second metal of the outer shell is selected from a group consisting of titanium, chromium, nickel, cobalt, and combinations and alloys thereof.

12. The fan blade according to claim 1, wherein the outer shell is plated onto the galvanic separator.

13. The fan blade according to claim 1, wherein the non-conductive fabric layer comprises the solid metal particles integrated into the outer surface thereof.

14. The fan blade according to claim 1, wherein the solid metal particles are formed of a metal selected from a group consisting of cobalt, nickel, copper, silver, aluminum, and combinations thereof.

15. The fan blade of claim 1, wherein a mechanical interlock is defined between of the plurality of solid metal particles and the outer shell.

16. A method of galvanically protecting a fan blade of a fan of a gas turbine engine, the fan blade having a core made of a first metal and a protective outer shell covering at least a portion the core, the outer shell formed of a second metal different from the first metal, the method comprising galvanically separating the core of the fan blade from the outer shell by applying a galvanic separation layer therebetween, the galvanic separation layer comprising an adhesive layer formed of a supported film adhesive having a non-metallic mat embedded therein, a non-conductive fabric layer superposed on top of the adhesive layer, and a plurality of solid metal particles disposed on an outer surface of the non-conductive fabric layer and disposed between the non-conductive fabric layer and the outer shell, the plurality of solid metal particles in contact with the outer shell along contact interfaces therebetween, at least one of the contact interfaces between the outer shell and at least one of the plurality of solid metal particles extending over a majority of an outer surface of the at least one of the plurality of solid metal particles.

17. The method of claim 16, wherein applying the galvanic separation layer comprises the steps of:
   a) applying the supported film adhesive on the at least a portion of the core of fan blade;
   b) after step a), tackify the non-conductive fabric layer and dispose the non-conductive fabric layer over the supported film adhesive;
   c) after step b), disposing the plurality of solid metal particles onto the outer surface of the non-conductive fabric layer; and
   d) after step c), curing and bonding the supported film adhesive and the non-conductive fabric layer onto the at least a portion of the core of the fan blade, thereby forming the galvanic separation layer;
   e) after step d), grit blasting the galvanic separation layer to expose the plurality of solid metal particles on the outer surface of the non-conductive fabric layer, the solid metal particles being encapsulated by adhesive from the curing and bonding process of step d); and
   f) after step d), plating the outer shell over the non-conductive fabric layer, having said plurality of solid metal particles, of the galvanic separation layer.

18. The method of claim 16, wherein the plurality of solid metallic particles are disposed on the non-conductive fabric layer after the non-conductive fabric layer is disposed over the supported film adhesive.

19. The method of claim 16, wherein the at least a portion of the core corresponds to an entirely of an airfoil portion of the fan blade.

20. A turbomachine component of a gas turbine engine, the turbomachine component comprising an airfoil having a core made of a first metal, an outer shell covering at least a portion of the core of the airfoil, and a galvanic separator disposed between the at least a portion of the core and the outer shell, the outer shell being composed of a second metal different than the first metal of the core, the galvanic separator comprising: an adhesive film covering the at least a portion of the core; a non-conductive fabric covering the adhesive film; and a plurality of solid metal particles between the non-conductive layer and the outer shell, the plurality of solid metal particles in contact with the outer shell along contact interfaces therebetween, at least one of the contact interfaces between the outer shell and at least one of the plurality of solid metal particles extending over a majority of an outer surface of the at least one of the plurality of solid metal particles.

* * * * *